April 30, 1957   J. F. KOPCZYNSKI   2,790,503
TRACTION DRIVE FOR VEHICLES HAVING NON-CIRCULAR WHEELS
Filed Jan. 19, 1955   3 Sheets-Sheet 1
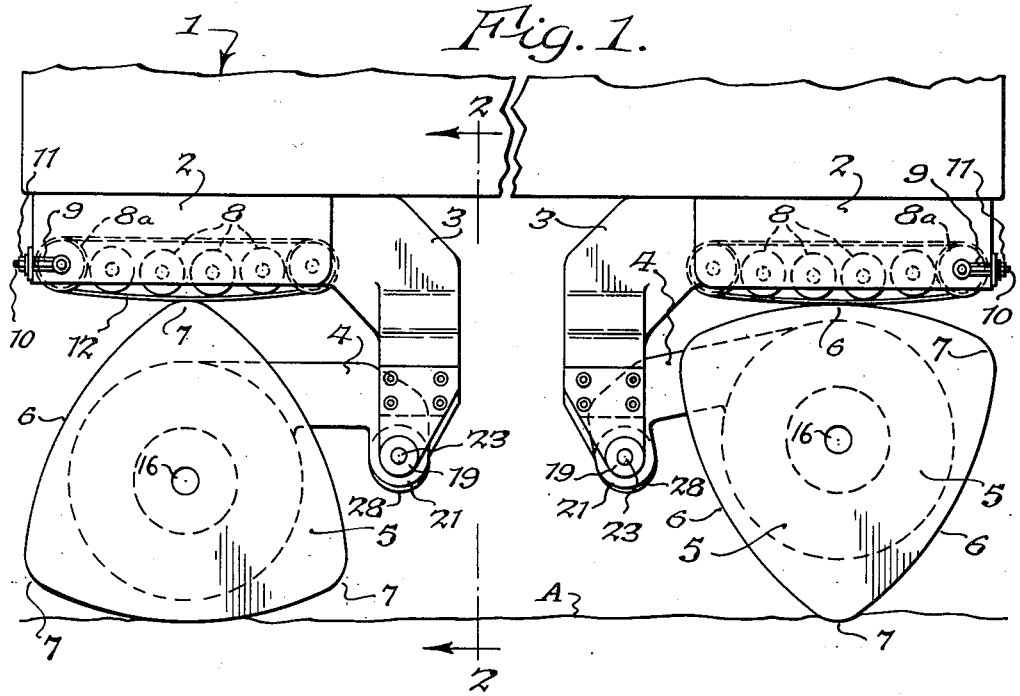
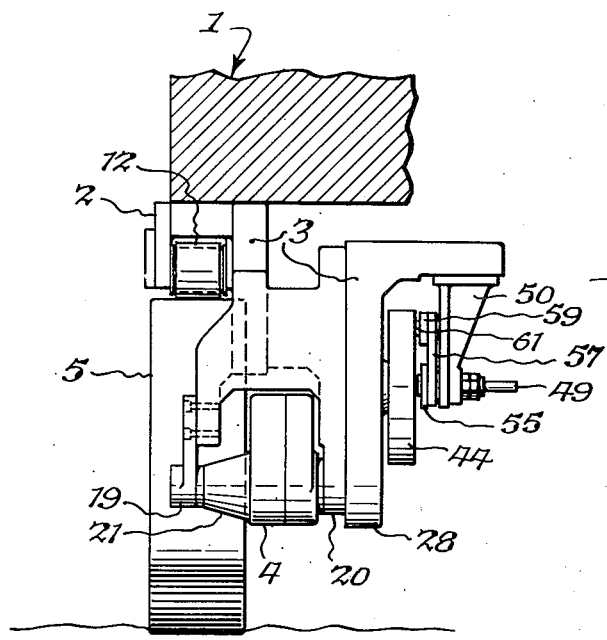
INVENTOR.
John F. Kopczynski
BY
Attorneys.

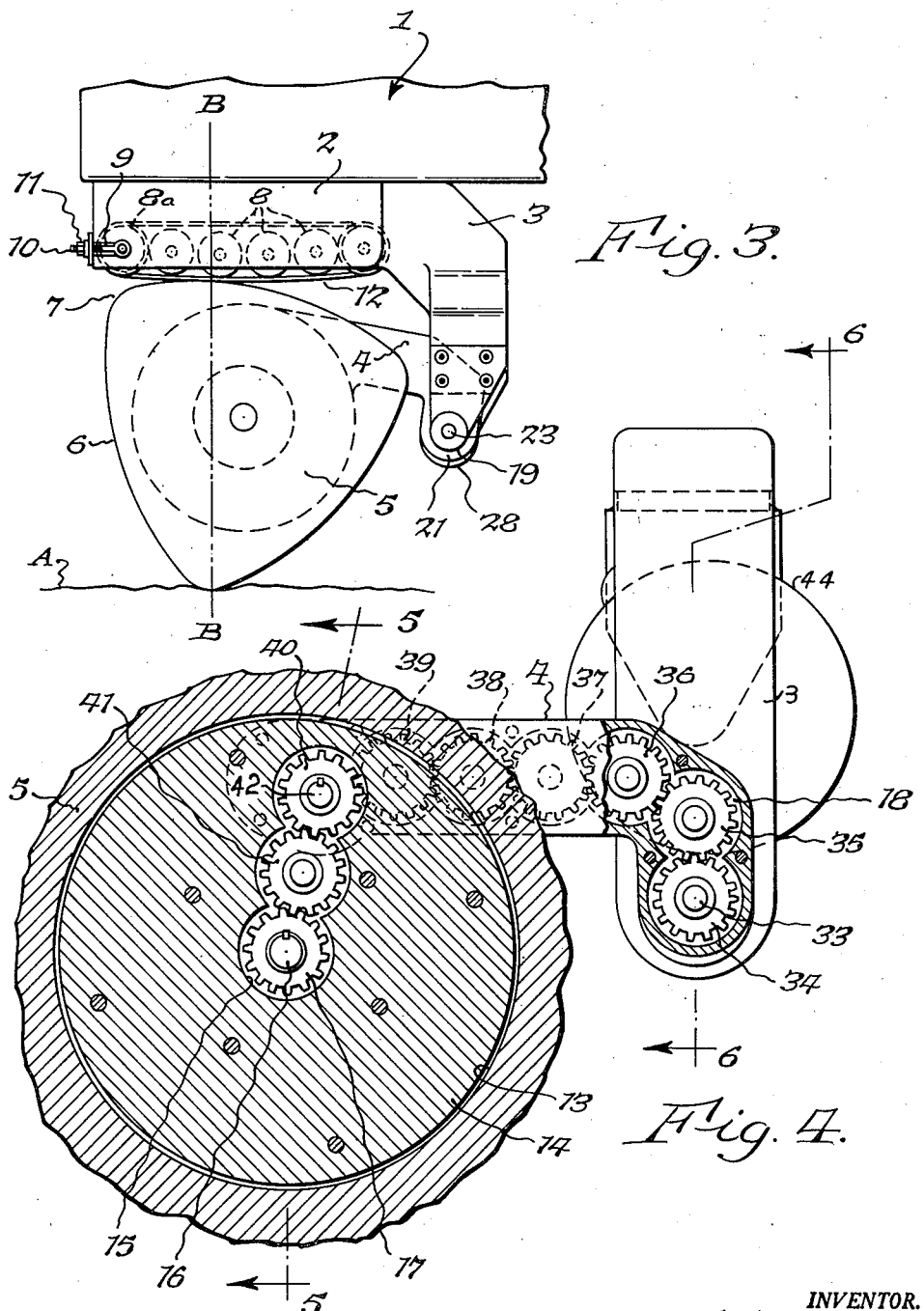

April 30, 1957 J. F. KOPCZYNSKI 2,790,503
TRACTION DRIVE FOR VEHICLES HAVING NON-CIRCULAR WHEELS
Filed Jan. 19, 1955 3 Sheets-Sheet 3
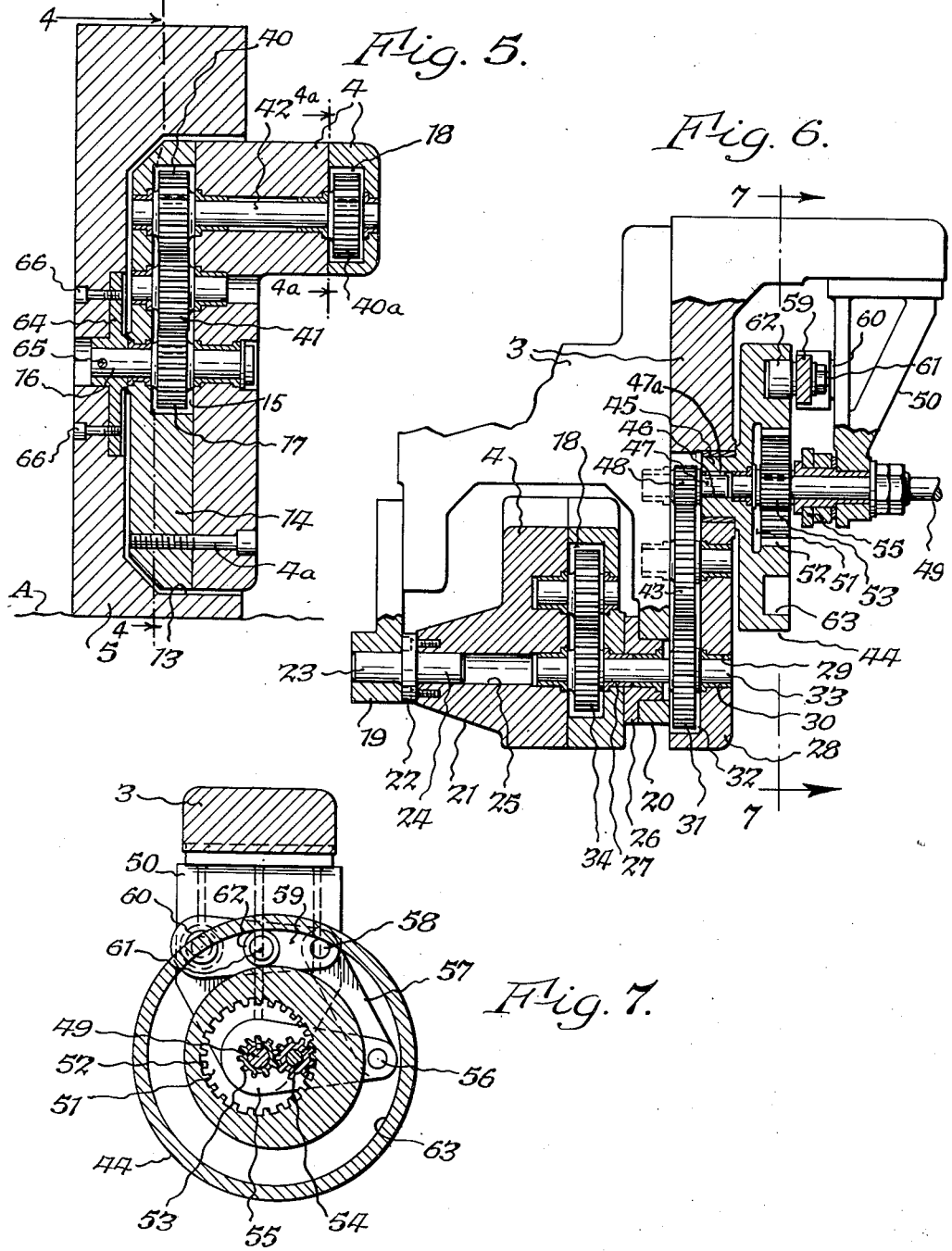
INVENTOR.
John F. Kopczynski
BY
Parker, Brochman & Farmer
Attorneys.

United States Patent Office 2,790,503
Patented Apr. 30, 1957

2,790,503

TRACTION DRIVE FOR VEHICLES HAVING NON-CIRCULAR WHEELS

John F. Kopczynski, Buffalo, N. Y.

Application January 19, 1955, Serial No. 482,783

13 Claims. (Cl. 180—7)

This invention relates to vehicles and particularly to a rolling, driving support therefor, and is in the nature of an improvement upon the rolling support in my copending application Serial No. 376,341 filed August 25, 1953.

An object of this invention is to improve the traction device shown in my said copending application and reduce or eliminate any upward movements imparted to the vehicle body as the traction wheel with its non-circular, polygonal periphery rotates during travel of the vehicle.

Another object of the invention is to provide an improved traction device for supporting and propelling a vehicle which it supports, which will exert a maximum possible traction effort in propelling a vehicle it helps support, over all kinds of roadways, which will operate with exceptional smoothness of ride of the vehicle at all speeds at which it travels, with which the weight of the vehicle will not exert any material movement-propelling force on the vehicle at any time, which offers a minimum of resistance to movement of the vehicle, and which will be relatively simple, practical, compact, efficient and inexpensive.

Other objects and advantages will be apparent from the following description of one embodiment of the invention, and the novel features will be particularly pointed out hereinafter in connection with the appended claims.

In the accompanying drawings:

Fig. 1 is a side elevation of the lower part of a vehicle supported and propelled by traction devices constructed and operated in accordance with this invention;

Fig. 2 is a sectional elevation of a part of the same, the section being taken approximately along the line 2—2, Fig. 1.

Fig. 3 is a side elevation of one of the traction devices similar to Fig. 1, but with the wheel in a somewhat different angular position in its rotation, to illustrate how the line of support remains approximately vertical as the wheel rotates;

Fig. 4 is a longitudinal, sectional elevation, on a larger scale, of part of the traction device of Figs. 1 to 3, the section being taken approximately along line 4—4 of Fig. 5, through and along the arm upon which a wheel is mounted and which, in turn, is pivotally connected to the body of the vehicle, and with part of arm 4 broken away approximately along the line 4a—4a of Fig. 5;

Fig. 5 is a sectional elevation of the parts shown in Fig. 4, the section being taken approximately along the line 5—5, of Fig. 4;

Fig. 6 is a sectional elevation of another part of the traction device, the section being taken approximately along the line 6—6 of Fig. 4, and Fig. 7 is another sectional elevation of part of the construction illustrated in Fig. 6, the section being taken approximately along the line 7—7, Fig. 6.

In the illustrated embodiment of the invention, the body 1 of the vehicle (Fig. 1) is provided at each side, and at the front and rear thereof, with a traction device made in accordance with this invention. A frame 2 is secured to the bottom of the vehicle at each traction device, and an arm 3 extends downwardly from an end of each frame 2. This arm preferably extends from the forward end of the frame 2 at the rear traction device, and from the rear end of the frame 2 at the front traction device.

A walking arm 4 is pivoted at one end to the lower end of each arm 3, and at its other or free end it rotatably mounts a traction wheel 5 beneath the frame 2 from which that arm 3 extended. The periphery of each wheel 5, which runs on the roadway, is approximately or generally of polygonal form, with the sides 6 of the polygon arcuate and convex, and having radii of curvature greater than the distance from the sides to the axis of rotation of the wheel, and preferably more than twice that distance to said axis. The corner 7 where the sides of the polygon meet are also arcuate and convex, each with radii of curvature less than the distance from the curve at that corner to the axis of rotation of that wheel, and preferably less than half that distance from the curve at the corners to said axis of rotation of that wheel. In the particular wheel illustrated, the wheel periphery is of generally or approximately triangular shape, with the sides 6 having relatively long radii of curvature and the corners 7 having relatively short radii of curvature.

Rotatably mounted by each frame 2 at its lower face, is a row of rollers 8 arranged side by side but just out of contact with each other, such as the way the rollers are arranged in a roller bearing. The row of such rollers is arcuate and downwardly convex with a relatively long radius of curvature. One of the end rollers 8a is movable in a direction along the row, and to accomplish this the end roller 8a has its bearing shaft ends connected to a forked member 9 that has a stud 10 passing through an end of the frame 2 and carrying a nut 11 which, by contact with the outer end face of the frame 2, will pull the end roller in a direction along said row. An endless belt track 12 passes around the row of rollers, so that such adjustment of the end roller 8a will tighten or loosen the track, depending upon the direction of rotation of nut 11. Both end rollers are preferably slightly larger in diameter than the intermediate rollers.

The curvature of the arc of the lower stretch of the belt track 12 depends upon the curvature of the sides of the polygon. By proper design and selection of the radius of curvature of the lower stretch of the belt track 12, the line of support of the wheel and vehicle body will remain approximately vertical as the wheel 5 rotates. This line of support designated B—B in Fig. 3, is a straight line passing through the points or areas of contact of the wheel 5 with the roadway A and the belt track 12. When a corner of the wheel is at the top center, the line of support passes through the axis of rotation of the wheel and will be vertical. This will be evident from Fig. 1. When the wheel starts to rotate, as in Fig. 3, the areas of contact of the wheel with the roadway and the tracks will shift to one side of a vertical line, but this line of support will always be approximately vertical in all rotary positions of the wheel. When the line of support is vertical, the load on the wheel from the body, transmitted through the frame 2 and track 12, will not impart any rotary-impelling force to the wheel in eithetr direction. When the wheel 5 is rotated by power, as will be explained later herein, its top periphery, by its frictional engagement with the belt track 12, will move the track 12 endwise. Since the track 12 moves by reason of its contact with the rotating wheel, the anti-friction rollers will reduce the frictional resistance to rotation of the wheel.

The traction wheel 5 has a central bearing cavity 13 (Fig. 4) opening through its inside face which fits over and has bearing upon a bearing hub 14 that is fixed upon the free end of the arm 4. The hub 14 has a central recess 15 and the wheel carries a stub shaft 16 that extends into this recess 15. A spur gear 17 fits over and is keyed or otherwise coupled to the shaft 16, so as to rotate with the shaft 16 and the wheel 5. The arm 4 is formed of three sections fitting together face to face (Figs. 2 and 6) and secured in that relation in any suitable manner, such as by screws 4a (Fig. 5) which unite the center section to the outside sections. The inside faces of the arm sections which abut about one another have cooperating recesses 18 (Figs. 4 and 6) in which trains of gearing are arranged.

Referring now particularly to Fig. 6, the lower end of the arm 3 which depends downwardly from each frame 2 is forked to provide spaced ends 19 and 20. Between the end 19 and a hub 21 on the outer face of the pivoted end of arm 4 is a flange 22 which is secured to the free end of the boss 21. This flange, on one face, has a stub shaft 23 which is rotatably received in the end 19, and on its other face has a stub shaft 24 alined with shaft 23, which is rotatably received in a passage 25 in one section of arm 4. In the end 20 of the forked end of arm 3, is a bushing 26 having a low friction sleeve 27 therein. Another depending part 28 of the frame 2 has a bearing passage 29 alined with the passage in the bushing 26 and also having a low friction sleeve 30. A gear 31 is disposed in a recess 32 in the part 28 and fixed on a shaft 33 which rotatably bears in lining sleeves 27 and 30.

This shaft 33 extends through one part of the arm 4 and into the other where it terminates in passage 25 in axial alinement therewith. A gear 34 is also fixed on shaft 33 in one of the cavities or recesses 18 of arm 4 at the pivoted end of that arm. Successively meshing idler gears (Fig. 4) 35, 36, 37, 38, 39, 40, 40a and 41 are arranged in a train and pivotally mounted in successive spaces 18 in the arm 4 and its hub 14. The gear 35 at one end of the train meshes with and is driven by the gear 34 that is concentric with the pivotal rocking axis of the arm 4, and the gear 41 at the other end of the train meshes with and drives the gear 17 on the stub shaft 16 of the wheel 5.

Referring particularly to Fig. 5, the idler gear 40 is keyed to one end of a shaft 42, and on the other end of that shaft is keyed another gear 40a that meshes with gear 39. Thus gears 34, 35, 36, 37, 38, 39 and 40a are in one train where the gears successively mesh, and gears 40, 41 and 17 are in another train where the gears mesh successively, and both gear trains are coupled by the shaft 42 which carries gears 40 and 40a. This provides a gear drive from shaft 33 to the wheel. To operate this gear drive, the gear 31 (Fig. 6) meshes with and is driven by a gear 43 rotatably mounted on the arm 3.

A cam wheel 44 (Figs. 6 and 7) has a hub 45 projecting axially from one face of the wheel 44 and rotatably mounted in arm 3. The cam wheel has an axial passage 46 that extends through the hub 45 and in one end receives a stub shaft 47 that extends beyond the hub and has fixed thereon a pinion 48 that meshes with and drives gear 43. The shaft 47 is keyed by key 47a to the hub of the cam wheel so as to rotate therewith. A main drive shaft 49 is rotatably mounted in the lower end of a depending bracket 50 on the frame 3, and one end of it is rotatably received in the passage 46 in the cam wheel. The cam wheel has a recess 51 in its face opposite from hub 45 but concentric therewith, and the periphery of this recess is provided with teeth to form an internal gear 52 (Fig. 7) which is concentric with the shaft 49. The shaft 49 has keyed thereon a pinion 53, and this pinion meshes with an idler pinion 54 (Fig. 7), which is rotatably mounted on the side of an arm 55 that is pivoted at one end on the main shaft 49.

The arm 55 extends across that face of the cam wheel which has the recess 51, and the pinion 54 extends into the recess 51 and meshes with both pinion 53 and the internal gear 52. The free end of arm 55 (Fig. 7) is pivoted by pin 56 to one end of a link 57, whose other end is pivoted by pin 58 to the free end of an arm 59. This arm 59 is pivoted by pin 60 to the bracket 50 and extends generally in the same direction as the arm 55. Intermediate of its ends the arm 59 carries a stud 61 that projects therefrom at one side and rotatably mounts a cam follower or roller 62. The face of the cam wheel 44 (Figs. 6 and 7) which is provided with the recess 51, also has an endless cam groove or channel 63 which extends about and around the recess 51 but is eccentric thereto, as shown in Fig. 7, and the cam roller 62 runs in this cam groove 63.

The main shaft 49 extends through and beyond the bracket 50 and there receives driving power from any suitable source. An electric motor may be connected to each shaft 49 to drive it, or the shaft may be connected to a motor or engine that drives all four of the main shafts 49 through suitable clutches and differentials, as usual in motor operated vehicles. Since such driving means are well known in motor vehicles, the details thereof have not been illustrated.

In operation, each main shaft 49 is power driven for rotation, and pinion 53 rotates with it. Through the idler pinion 54, the pinion 53 drives the internal gear 52 and thus rotates the cam wheel 44. The cam wheel 44 is keyed, by key 47a, to shaft 47 and rotates it, and through its gear 48 and idler gear 43, rotates the gear 31 and its shaft 33. This shaft 33 through gear 34 drives the double chain of gearing shown in Figs. 4 and 5 to drive the gear 17, which is fixed on shaft 16. This shaft 16 is pinned or fixed to a plate 64 (Fig. 5), such as by a pin 65, and plate 64 is secured to the wheel by screws 66. This causes the wheel 5 to rotate on the arm 4, as the arm 4 moves up and down at its free end which carries the wheel.

Since the periphery of the wheel 5 is generally polygonal; in the illustrated embodiment it is generally triangular, the wheel will propel the vehicle faster while the corner of the polygon of the periphery is in contact with the roadway, than it will when the sides of the polygon are rolling over the roadway. Referring now to Fig. 7 particularly, it will be observed that if the arm 55 is moved angularly in the direction in which the cam wheel is rotating, the actual speed imparted to the cam wheel 44 from the pinion 53 and the main shaft 49 will be increased, and if it is moved in the opposite direction, the actual speed to the cam wheel 44 will be decreased. The reason for this is as follows: Assuming that the gear 53 on shaft 49 is rotating clockwise in Fig. 7 at a selected rate. If arm 55 is stationary, the idler pinion merely idles and transmits motion from gear 53 to the internal gear 52 of the cam, driving the cam counterclockwise at the same speed as if the gear 53 was meshing directly with the internal gear 52. If, however, idler 54 moves with arm 55 counterclockwise, which is the direction in which the gear 52 is rotating, the teeth of the idler, which mesh with gear 52 instead of rotating at the same speed as the gear 53, will roll around the gear 53 counterclockwise, which is in a direction opposite to that at which the gear 53 is rotating, so that more teeth of gear 53 will be engaged with teeth of idler 54 for a revolution of gear 53 than when the idler did not move bodily about the axis of shaft 49. This increases the speed of rotation of the idler 54 on its own axis, and hence will drive the internal gear 52 and cam 44 faster. When arm 55 moves clockwise in Fig. 7, which is counter to the rotation of internal gear 52, the teeth of idler gear 54 will move somewhat with the teeth of drive gear 53, and hence gear 54 will not then be revolved as rapidly on its own axis by gear 53, and will not rotate the internal gear as rapidly, so that the speed of rotation of the cam will be decreased.

The cam roller 62 is caused to move up and down repeatedly by the eccentric cam groove 63 and this oscillates the arm 59 through the link 57, arm 59 causes a similar oscillation of the arm 55 and this causes the idler pinion 54 to move back and forth along the internal gear 52 and thus repeatedly accelerate and decelerate the rate at which the cam wheel is rotated. This acceleration is timed by the cam groove 63 to provide acceleration as the corner of the wheel 4 in contact with the roadway passes center position and contact begins with a side of the polygon periphery of the wheel. It also is timed to cause deceleration of the wheel as the next corner of the wheel begins to engage the roadway. Thus the wheel speed is accelerated and then decelerated as each corner rolls upon the roadway, which causes the vehicle so propelled to move at a substantially uniform speed determined by the speed of the main shaft 49.

The combined curves on the periphery of each wheel and of the row of rollers and belt 12 are designed to keep always vertical, the line of support joining the points of contact of the wheel periphery with the roadway and the belt 12, so that the weight of the vehicle applied to the wheel will not exert a turning force on the wheel in either direction. This line of support will always be substantially vertical as it moves forwardly and rearwardly to a limited extent as the wheel rotates. It will be observed from the drawing, Fig. 1, that the sides of the polygonal periphery of each wheel are equal in length and radius, and when there are three sides, that a line joining each corner with the middle of the side opposite from that corner passes through the axis of rotation of the wheel. The arcuate, convex curvature of the lower stretch of the endless belt 12 is selected so that vertical line from the point of contact of the wheel on the ground will pass through the point of contact of the wheel with belt 12. This is shown by the line B—B in Fig. 3, and it will be obvious when the wheels are shown as in Fig. 1. Each wheel will drive the vehicle in either direction at a uniform rate, depending upon the direction of rotation of the main shaft, without causing vertical movements of the vehicle body except as the undulations of the roadway may be transmitted to the vehicle body.

It will be understood that various changes in the details and arrangements of parts which have been herein described and illustrated in order to explain the nature of the invention may be made by those skilled in the art within the principle and scope of the invention as expressed in the appended claims.

I claim:

1. A traction device for vehicles comprising a vehicle body, an arm hinged to said body for vertical oscillation, a rigid wheel rotatably mounted on the free end of said arm and having an approximately polygonal periphery which runs on the roadway, each of the sides of the polygon being convex and arcuate and having a radius of curvature greater than twice the shortest distance from that polygon side to the axis of rotation of the wheel, and the corners of the wheel where the sides of the polygon intersect being arcuate and convex with radii of curvature less than said shortest distance from the side wall to the axis of rotation of the wheel, an abutment carried on each body above a wheel for relative movement on the body in the directions of travel of the body when the wheel rotates, and engaged by the top of the wheel to limit movement of the wheel towards the body, said abutment being movable on said body at the area of contact with the wheel below it in a direction in which the body may travel when that wheel rotates, and driving means coupled to said wheel to impart rotation thereto.

2. A traction device for vehicles comprising a vehicle body, an arm hinged to said body for vertical oscillation, a rigid wheel rotatably mounted on the free end of said arm and having an approximately polygonal periphery which runs on the roadway, each of the sides of the polygon being convex and arcuate and having a radius of curvature greater than twice the shortest distance from that polygon side to the axis of rotation of the wheel, and the corners of the wheel where the sides of the polygon intersect being arcuate and convex with radii of curvature less than said shortest distance from the side wall to the axis of rotation of the wheel, an abutment carried on each body above a wheel for relative movement on the body in the directions of travel of the body when the wheel rotates, and engaged by the top of the wheel to limit movement of the wheel toward the body, said abutment being movable on said body at the area of contact with the wheel below it in a direction in which the body may travel when that wheel rotates, a driving member carried by said body, and a train of driving connections from said driving member to said wheel through said arm.

3. A traction device for vehicles comprising a vehicle body, an arm hinged to said body for vertical oscillation, a rigid wheel rotatably mounted on the free end of said arm and having an approximately polygonal periphery which runs on the roadway, each of the sides of the polygon being convex and arcuate, with a radius of curvature greater than twice the shortest distance from that polygon side to the axis of rotation of the wheel, and the corners of the wheel where the sides of the polygon intersect being arcuate and convex with radii of curvature less than said shortest distance from the side wall to the axis of rotation of the wheel, an abutment carried on each body above a wheel for relative movement on the body in the directions of travel of the body when the wheel rotates, and engaged by the top of the wheel to limit movement of the wheel towards the body, said abutment being movable on said body at the area of contact with that wheel below it in a direction in which the body may travel when the wheel rotates, a driving member carried by said body, and a train of driving connections from said driving member to said wheel through said arm, including a pinion having an axis of rotation coincident with the axis of rocking of said arm and a train of gears on said arm from said pinion to said wheel.

4. A traction device for vehicles comprising a vehicle body, an arm hinged to said body for vertical oscillation, a rigid wheel rotatably mounted on the free end of said arm and having an approximately polygonal periphery which runs on the roadway, each of the sides of the polygon being convex and arcuate, with a radius of curvature greater than twice the shortest distance from that polygon side to the axis of rotation of the wheel, and the corners of the wheel where the sides of the polygon intersect being arcuate and convex with radii of curvature less than said shortest distance from the side wall to the axis of rotation of the wheel, an abutment carried on each body above a wheel for relative movement on the body in the directions of travel of the body when the wheel rotates, and engaged by the top of the wheel to limit movement of the wheel toward the body, said abutment being movable on said body at the area of contact with the wheel below it in a direction in which the body may travel when that wheel rotates, a driving member carried by said body, a train of driving connections from said driving member to said wheel through said arm, and means in said connections for alternately accelerating and decelerating the speed of rotation of said wheel, once for each corner of the polygon, the speed accelerating when a corner of the polygon begins contact with the roadway and decelerating as that corner begins to leave contact with the roadway.

5. A traction device for vehicles comprising a vehicle body, an arm hinged to said body for vertical oscillation, a rigid wheel rotatably mounted on the free end of said arm and having an approximately polygonal periphery which runs on the roadway, each of the sides of the polygon being convex and arcuate, and having a radius of curvature greater than twice the shortest distance from that polygon side to the axis of rotation of the wheel, and the corners of the wheel where the sides of the polygon intersect being arcuate and convex with radii of curvature less than said shortest distance from the side wall to the axis of rotation of the wheel, an abutment carried on each body above a wheel for relative movement on the body in the directions of travel of the body when the wheel rotates, and engaged by the top of the wheel to limit movement of the wheel toward the body, said abutment being movable on said body at the area of contact with the wheel below it in a direction in which the body may travel when that wheel rotates, a driving member carried by said body, a train of driving connections from said driving member to said wheel through said arm, a cam rotated by said train, and means operated by said cam for accelerating the rotation of the wheel as a corner of the polygon begins to lift the wheel by contact with the roadway, and decelerating the rotation as that corner lowers the wheel.

6. A traction device as set forth in claim 1, with the polygonal periphery having three equal sides and radii of curvature, and the abutment being arcuately convex and facing downwardly, and having a radius of curvature relative to the radius of curvature of the sides of the polygonal periphery of the wheel, whereby to contact the wheel periphery in a vertical line through the point of contact of the wheel with the roadway, so that the theoretical supporting line of support joining the areas of contact between the wheel and the roadway, and the wheel and said abutment being always vertical as the wheel rotates and moves up and down.

7. A traction device for vehicles comprising a vehicle body, an arm hinged to said body on a horizontal axis for vertical oscillation of an end thereof about said axis, a wheel rotatably mounted on a free end of said arm, and having a rigid, equal-sided, approximately polygonal periphery, each side of the polygon of said periphery being convex and arcuate, with the same relatively long radius of curvature passing through the axis of rotation of the wheel in all of its rotary positions, and each corner of the polygon where the sides meet being also outwardly convex and arcuate but with a relatively short radius of curvature also passing through the axis of rotation of the wheel in all of its rotary positions, and an endless belt type of track carried by said body above said wheel with a lower stretch extending and movable in the direction of travel of the vehicle and engaged by the periphery of said wheel below it, said track being freely movable in said directions of travel, and means on said body holding the said lower stretch of said track downwardly and arcuately convex during its travel in the lower stretch.

8. A traction device for vehicles comprising a vehicle body, an arm hinged to said body on a horizontal axis for vertical oscillation of an end thereof about said axis, a wheel rotatably mounted on a free end of said arm and having a rigid body that is approximately uniformly polygonal in peripheral shape with sides of equal size, each side of the polygon of said periphery being outwardly convex and arcuate, with a relatively long radius of curvature passing through the axis of rotation of the wheel, and the periphery of each corner of the polygon where the sides meet being also convex and arcuate but with a relatively much shorter radius of curvature whose center of curvature lies in a line joining the center of the corner with the axis of rotation of the wheel, an endless belt type of track carried by said body above said wheel, with a lower stretch extending and movable in the direction of travel of the vehicle and engaged by the periphery of said wheel below it, said track being freely movable in said directions of travel, means on said body holding said lower stretch downwardly and arcuately convex during its travel in the lower stretch, and means coupled to said wheel by which the latter may be rotated in different oscillatory positions of said arm.

9. A traction device for vehicles comprising a vehicle body, an arm hinged to said body on a horizontal axis for vertical oscillation of an end thereof about said axis, a wheel rotatably mounted on a free end of said arm and having a rigid body with an approximately polygonal periphery, each side of the polygon of said periphery being outwardly convex and arcuate with a relatively long radius of curvature passing through the axis of rotation of the wheel, and the periphery of each corner of the polygon where the sides meet being also outwardly convex and arcuate but with a relatively much shorter radius of curvature whose center of curvature lies in a line joining the center of the corner with the axis of rotation of the wheel, an abutment element above said wheel and with the lower surface of which said wheel engages to limit upward movement of the wheel, said lower surface of the abutment being arcuate and downwardly convex by an amount which, with the curvature of the wheel periphery, will keep the line of support of said wheel approximately vertical, and driving means connected to said wheel by which the wheel may be caused to rotate in the different oscillatory positions of said arm.

10. A traction device for vehicles comprising a vehicle body, an arm hinged to said body on a horizontal axis for vertical oscillation of an end thereof about said axis, a wheel rotatably mounted on a free end of said arm and having a rigid body with an approximately polygonal tread periphery, each side of the polygon of said periphery being outwardly convex and arcuate with a relatively long radius of curvature passing through the axis of rotation of the wheel, and the periphery of each corner of the polygon where the sides meet being also outwardly convex and arcuate but with a relatively much shorter radius of curvature whose center of curvature lies in a line joining the center of the corner with the axis of rotation of the wheel, an abutment element above said wheel and with the lower surface of which said wheel engages to limit upward movement of the wheel, said lower surface of the abutment being arcuate and downwardly convex by an amount which, with the curvature of the wheel periphery, will keep the line of support of said wheel approximately vertical, and driving means connected to said wheel by which the wheel may be caused to rotate in the different oscillatory positions of said arm, the part of said abutment element which is engaged by said wheel being movable freely on the body in the direction of travel of said body.

11. A traction device for vehicles comprising a vehicle body, an arm hinged to said body on a horizontal axis for vertical oscillation of an end thereof about said axis, a wheel rotatably mounted on a free end of said arm and having a rigid body that is approximately uniformly polygonal in peripheral shape, with sides of equal lengths and curvatures, each side of the polygon of said periphery being outwardly convex and arcuate, with a relatively long radius of curvature passing through the axis of rotation of the wheel, and the periphery of each corner of the polygon where the sides meet being also outwardly convex and arcuate but with a relatively shorter radius of curvature whose radius of curvature lies in a line joining the center of the corner with the axis of rotation of the wheel, a series of rollers arranged side by side in an arcuate and downwardly convex row extending in the direction of travel of said body above said wheel, and an endless belt track extending around the row of rollers with its lower stretch between the rollers and the wheel and engaged by the wheel, whereby, as the wheel rotates, the top of its periphery will move said belt endwise, and driving means by which the wheel may be caused to rotate.

12. A traction device for vehicles comprising a vehicle body, an arm hinged to said body on a horizontal axis for vertical oscillation of an end thereof about said axis, a wheel rotatably mounted on a free end of said arm and having an approximately polygonal periphery that runs on the roadway, each side of the polygon of said periphery being convex and arcuate with a relatively long radius of curvature, and each corner of the polygon where the sides meet being also convex and arcuate but with a relatively short radius of curvature, a series of rollers arranged side by side in an arcuate row which is downwardly convex and extending in the direction of travel of said body, above said wheel, and an endless belt extending around the row of rollers with its lower stretch between the rollers and the wheel and engaged by the wheel, whereby, as the wheel rotates, the top of its periphery will move said belt endwise, and driving means by which the wheel may be caused to rotate.

13. A traction device for vehicles comprising a vehicle body, an arm hinged to said body on a horizontal axis for vertical oscillation of an end thereof about said axis, a wheel rotatably mounted on a free end of said arm and having an approximately polygonal periphery with three sides of equal lengths and curvatures, each side of the polygon of said periphery being outwardly convex and arcuate with a relatively long radius of curvature passing through the axis of rotation of the wheel, and each corner of the polygon where the sides meet being also outwardly convex and arcuate but with a relatively much shorter radius of curvature whose center of curvature lies in a line joining the center of the corner with the axis of rotation of the wheel, a series of rollers arranged side by side in an arcuate row which is downwardly convex and extending in the direction of travel of said body, above said wheel, and an endless belt extending around the row of rollers with its lower stretch between the rollers and the wheel and engaged by the wheel, whereby, as the wheel rotates, the top of its periphery will move said belt endwise, the radius of curvature of the lower stretch of said belt being selected, relatively to the radius of curvature of each side of the wheel, to keep the vertical line of support of said wheel approximately vertical throughout the rotation of said wheel and passing from side to side through the axis of rotation of the wheel, and driving means by which the wheel may be caused to rotate.

References Cited in the file of this patent
UNITED STATES PATENTS

| | | |
|---|---|---|
| 2,256,570 | Kopczynski | Sept. 23, 1941 |
| 2,711,221 | Kopczynski | June 21, 1955 |
| 2,714,011 | Albee | July 26, 1955 |